United States Patent
Laurin et al.

Patent Number: 5,908,084
Date of Patent: Jun. 1, 1999

[54] LIFTING AND RAISING DEVICE

[76] Inventors: Arthur E. Laurin, 13467 Bray Rd., Clio, Mich. 48420; Walter W. MacDonald, 11775 Block Rd., Birch Run, Mich. 48415

[21] Appl. No.: 09/056,721

[22] Filed: Apr. 7, 1998

Related U.S. Application Data

[60] Provisional application No. 60/042,952, Apr. 7, 1997.

[51] Int. Cl.$^6$ .................................................. A01M 31/02
[52] U.S. Cl. .......................................... 182/142; 182/187
[58] Field of Search ...................................... 182/142, 187

[56] References Cited

U.S. PATENT DOCUMENTS

| | | |
|---|---|---|
| 2,153,803 | 4/1939 | Jerabele . |
| 2,305,202 | 12/1942 | Smith . |
| 2,841,290 | 7/1958 | Van den Thoorn . |
| 2,989,320 | 6/1961 | Pennington . |
| 3,957,135 | 5/1976 | Lane . |
| 4,062,519 | 12/1977 | Jacobs . |
| 4,205,733 | 6/1980 | Wade . |
| 4,347,913 | 9/1982 | Cromer, Jr. . |
| 4,347,914 | 9/1982 | Gary . |
| 4,602,698 | 7/1986 | Grant . |
| 5,269,395 | 12/1993 | Lyzhoft .................................... 182/187 |

FOREIGN PATENT DOCUMENTS

| | | | |
|---|---|---|---|
| 47688 | 5/1916 | Sweden ..................................... | 182/76 |

*Primary Examiner*—Alvin Chin-Shue
*Attorney, Agent, or Firm*—Weintraub & Brady, P.C.

[57] ABSTRACT

A raising and lifting device comprises a shank member and an elevating device. The shank member has a first leg with a threaded portion for threaded attachment to a tree or similar structure; a second leg attached to the first leg substantially normal thereto; and a third leg attached to the second leg substantially normal thereto at the end of the second leg opposite the first leg. The elevating device is secured to the third leg. The elevating device comprises a pulley secured to the shank, around which a rope or similar device may be passed to raise a tree blind or other load up a tree or similar structure by pulling.

12 Claims, 3 Drawing Sheets

LIFTING AND RAISING DEVICE

CROSS-REFERENCE TO RELATED APPLICATION

This application claims the benefit of U.S. Provisional Application No. 60/042,952, filed Apr. 7, 1997, the disclosure of which is incorporated by reference.

BACKGROUND OF THE INVENTION

1. Field of the Invention:

The present invention pertains, generally, to lifting devices. More particularly, the present invention pertains to a sportsman's lifting and raising device. Even more particularly, the present invention concerns a sportsman's lifting and raising device particularly adapted for use with trees.

2. Prior Art:

Hunting is typically done either from the ground or from a height, such as from a tree. When hunting is done from a tree, a device for a hunter to stand or sit upon, as well as to hide the presence of the hunter, is typically raised into the tree. Several attempts have been made to provide devices to lift or raise persons or objects into trees. Five such devices are described below.

U.S. Pat. No. 3,957,135, issued May 18, 1976 to Lane, is entitled "CLIMBING DEVICE." The patent discloses a device for climbing a tree or similar structure. The device comprises a basket-like member secured to a pair of hangers that go around a pair of pulleys. The hangers are secured to the tree by chains secured to pipes that go around the tree.

U.S. Pat. No. 4,205,733, issued Jun. 3, 1980 to Wade, is entitled "PORTABLE ELEVATED STATION." The patent discloses a portable elevated station to be mounted to a tree. The station includes a platform suspended from a hoist. The hoist includes a drum. The hoist and the platform are suspended from a bough of a tree by a rope connected to the tree at one end and to the drum at the other end.

U.S. Pat. No. 4,347,913, issued Sep. 7, 1982 to Cromer, Jr., is entitled "CHAIR LIFT." The patent discloses a portable chair lift device for use by a hunter or the like for raising the person off the ground. The device includes a frame member which has a seat hung downwardly therefrom on ropes. A worm gear assembly is carried by the frame member. A hand crank is attached to the frame member for turning the worm gear. A rope is wound around a tree or similar structure and passes over a pulley attached to the worm gear. As the hand crank is turned, the seat is raised or lowered.

U.S. Pat. No. 4,347,914, issued Sep. 7, 1982 to Gary, is entitled "PORTABLE TREE SLING OR PORTABLE TREE STAND OR PORTABLE TREE HUNTING SLING, OR ALTERNATIVES THEREOF." The patent discloses a portable tree sling device comprising a rope to which is attached a fabric seat and a fabric back rest. The rope is wound around a pulley, to which is attached a hand crank. In use, the rope is to be cast over a bough of a tree and tied to the trunk of the tree. A user sits on the seat and cranks the seat higher or lower.

U.S. Pat. No. 4,602,698, issued Jul. 29, 1986 to Grant, is entitled "HUNTING CHAIR." The patent discloses a hunting chair device for elevating hunters and animals into a tree or similar structure. The device comprises an upright, hollow frame carrying a bracket below it. A reel is rotatably mounted in the bracket. A cable is attached to the reel, extends through the hollow frame, and exits through an open top. Foot pedals are attached to the reel for rotating the reel and winding the cable around it to elevate the chair into a tree. A seat and a handlebar-like member are attached to the frame. Brackets brace the chair against the tree. In use, a user sits on the seat and, by pedaling the foot pedals, raises or lowers the device.

It is to be appreciated that none of these references discloses a simple lifting and elevating device with a minimal number of parts and that attaches directly to a tree. The present invention, as detailed hereinbelow, addresses these issues.

BRIEF SUMMARY OF THE INVENTION

The present invention provides a lifting and raising device which generally comprises:

(a) a shank member or shank, and (b) a lifting or elevating element mounted to the shank member or shank.

The shank member comprises a first leg with a threaded portion for threaded attachment to a tree or similar structure, such as a pole or the like; a second leg attached to the first leg substantially normal thereto; and a third leg attached to the second leg substantially normal thereto at the end of the second leg opposite the first leg and projecting therefrom in a direction opposite to that of the first leg. The first leg, preferably, has a threaded portion to facilitate attachment of the device to a tree or a similar structure.

The elevating device is secured to the third leg. The elevating device comprises a pulley, around which a rope or similar device may be passed to raise a tree blind or other load up a tree or similar structure by pulling on the rope or similar device. The pulley may be a swivel pulley or a fixed pulley. If the pulley is a swivel pulley, it is secured to the third leg of the shank, preferably, by a ring to which the pulley is swivelably secured. If the pulley is a fixed pulley, it is secured to the third leg of the shank by the third leg passing through the housing of the pulley and frictionally engaging same. Lateral movement of the pulley is limited by at least one, and preferably at least two, stops on the third leg of the shank.

For a more complete understanding of the present invention, reference is made to the following detailed description and accompanying drawings. In the drawings, like reference characters refer to like parts through the several views, in which:

DETAILED DESCRIPTION OF THE INVENTION

Figure 1:
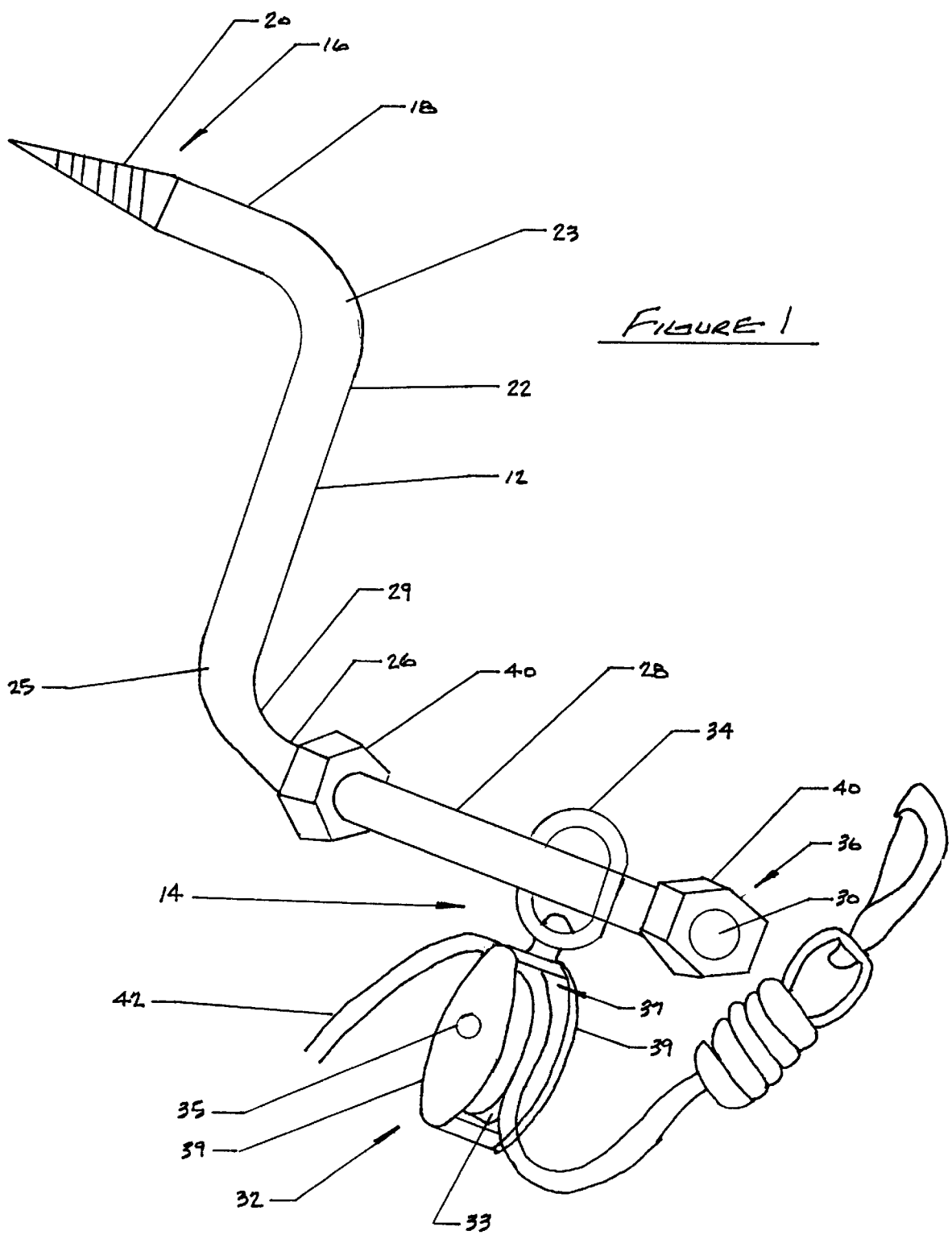
FIG. 1 is a perspective view of a lifting and raising device in accordance with the present invention.

Now, and in accordance with the present invention and as shown in the drawing, there is provided a lifting and raising device which generally comprises:

(a) a shank member or shank, and (b) a lifting or elevating element mounted to the shank member or shank.

More particularly, and with reference to FIG. 1, a lifting device in accordance with the present invention is, generally, denoted at 10.

The device hereof is particularly adapted for use by a sportsman and is intended to facilitate the elevating of a load off the ground and into a tree or similar structure, such as a pole or the like.

The lifting device 10 hereof comprises an elongated shank member 12 and an elevating element, generally, denoted at 14 for facilitating the lifting or elevating of a load such as a tree blind, hunting provisions, bicycle, etc. It should be noted that the type of load elevated by the present invention is not critical hereto. What is of importance is that the device facilitate the lifting thereof.

More specifically, the shank 12 includes a first securement portion 16 defined by a first leg 18 having at least a portion thereof provided with a thread 20. The first leg 18 is used to insert the shank member 12 into a tree or similar structure.

Extending from the leg 18 and substantially normal thereto is a second or intermediate leg 22. The intermediate leg 22 has a first end 23, which is disposed proximate the first leg 18 as shown, and an opposed second end 25. The intermediate leg 22, generally, extends parallel to the front of the tree or similar structure when the device is installed into the trunk of the tree or similar structure in typical fashion.

Projecting laterally outwardly from the intermediate leg 22 at the second end 25 thereof, in a direction substantially opposite the first leg 18, as shown, is a third or mounting leg 26. The mounting leg 26 comprises an elongated, substantially cylindrical member with a constrained end 29 proximate the intermediate leg 22 and an opposed free end 30 away from the intermediate leg 22, as shown. Optionally, a traction surface 28 may be imparted to the external surface thereof, as shown. The traction surface 28 may be imparted by any suitable method, such as by sandblasting, rasping, or otherwise imparting a roughened or knurled surface thereto. The mounting leg 26, although not designed for such a purpose, may, in an emergency, be used as a stepping leg which may be engaged by the foot of a user (not shown) for stepping thereonto.

The legs 18, 22, and 26 are, preferably, integrally formed with each other. Alternately, the legs 18, 22, and 26 may be separately formed and secured to each other by any suitable means well known to the skilled practitioner, such as welding; threaded fastening, if suitable threading is provided on the outer surfaces of the legs; or the like.

In accordance herewith, the lifting or elevating element 14 is mounted onto the mounting leg 26. As shown in FIG. 1, the lifting or elevating element 14, preferably, comprises a swivel pulley 32 which is suspended from the mounting leg 26 by a suitable mounting member, such as a ring 34. Typically, the pulley 32 includes a wheel 33 rotatably journalled onto an axle 35, in the well-known manner. The axle 35 spans the space 37 between a pair of spaced apart side walls 39, 39' and has its ends secured thereto, as shown, again in the well-known manner. The ring 34 surmounts the mounting leg 26, as shown, to enable the pulley 32 to be suspended therefrom. In order to prevent unwanted removal of the pulley from the mounting leg 26, there is provided means for retaining the ring 34 on the mounting leg 26 and, generally, denoted at 36. The means 36, preferably, comprises at least one stop member, such as a large nut 40 or similar member which is mounted onto the mounting leg 26 by any suitable means, such as by threaded interengagement, welding, or the like. Preferably, the stop member is disposed proximate the free end 30 of the mounting leg 26 so as not to interfere with the stepping function of the mounting leg 26. Preferably, a pair of spaced-apart stop members, e.g. nuts 40 and 40', are mounted onto the mounting leg 26.

It should be noted that the diameter of the ring 34 is less than that of the stop member(s) to prevent the ring 34 from sliding off the mounting leg 26.

Where threaded mounting of the stop member(s) is used, at least a portion of the mounting leg 26 is provided with a suitable thread (not shown) to which the stop member(s) may be threadably secured. As noted, other means of attachment and other configurations of the stop member may be used to provide a means for retaining the ring 34 on the mounting leg 26.

Figure 2:
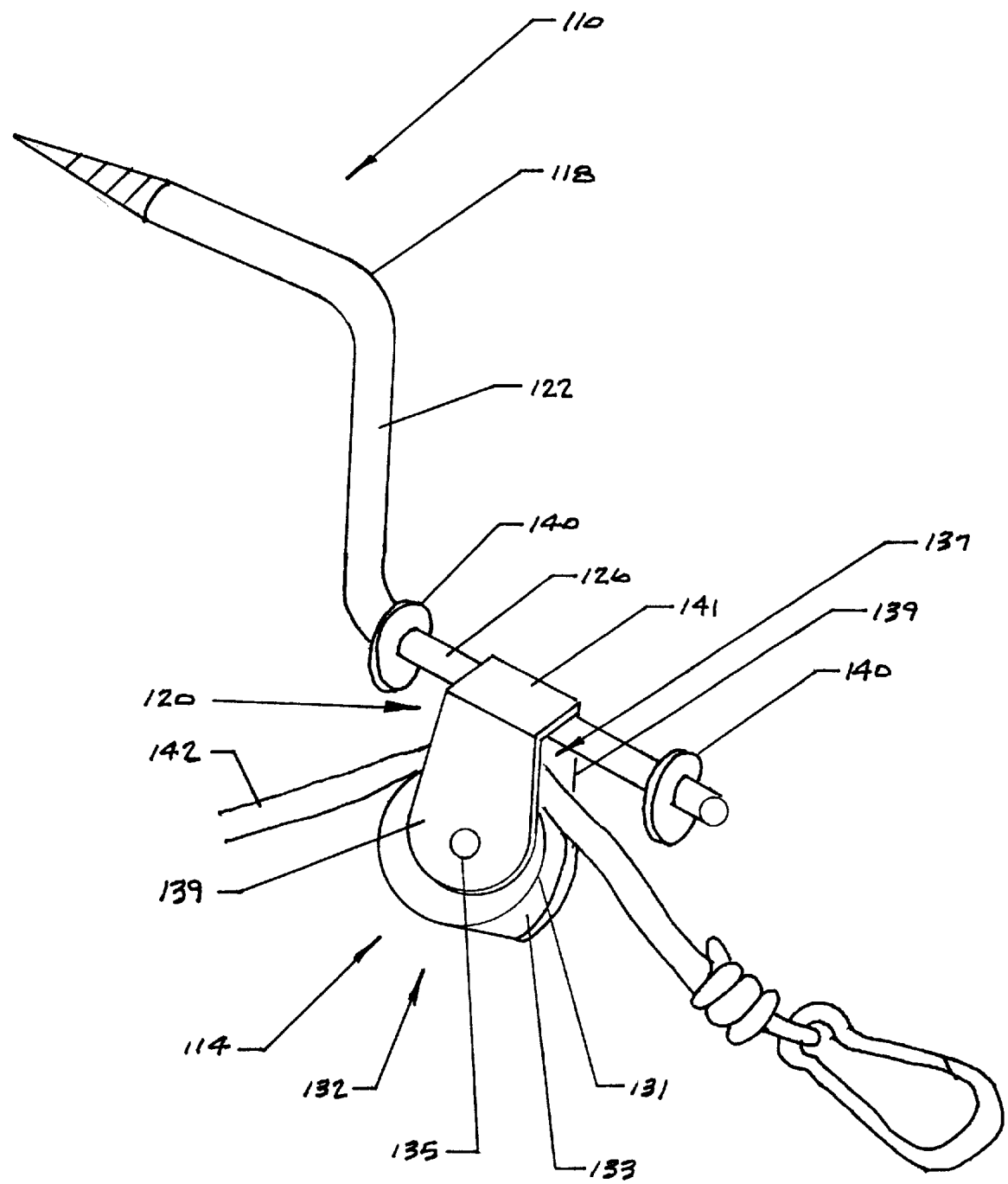
FIG. 2 is a perspective view of a further embodiment hereof.

Referring now to FIG. 2, there is depicted therein an alternate embodiment of the device, generally, denoted at 110. The device 110 is similarly constructed to the first embodiment, having a shank 112 and a lifting device 114. Thus, there are legs 118, 122, and 126 and retaining members 140 and 140' arrayed as defined hereinabove. Herein, the lifting element 114 comprises a pulley 132 having a grooved wheel 133 which is journalled on an axle 135. The grooved wheel 133 has a groove 131 formed circumferentially therein. The pulley 132 further comprises a housing 120 comprising spaced apart side walls 139, 139', respectively. The axle 135 spans the space 137 between the side walls 139, 139' and has its ends secured thereto. A top plate 141 is integral with the side walls 139, 139' and cooperates therewith to form a U-shaped housing. The mounting leg 126 extends through the space 137 between the side walls 139, 139' above the axle 135 and frictionally engages the top plate 141, as shown. In this regard the pulley 132 is a fixed pulley, as opposed to the swivel pulley of FIG. 1. Herein, the top plate 141 is slidable between the retaining members 140, 140'. A rope or cord 142 is threaded over the wheel 133 and seats in the groove 131 thereof.

Figure 3:
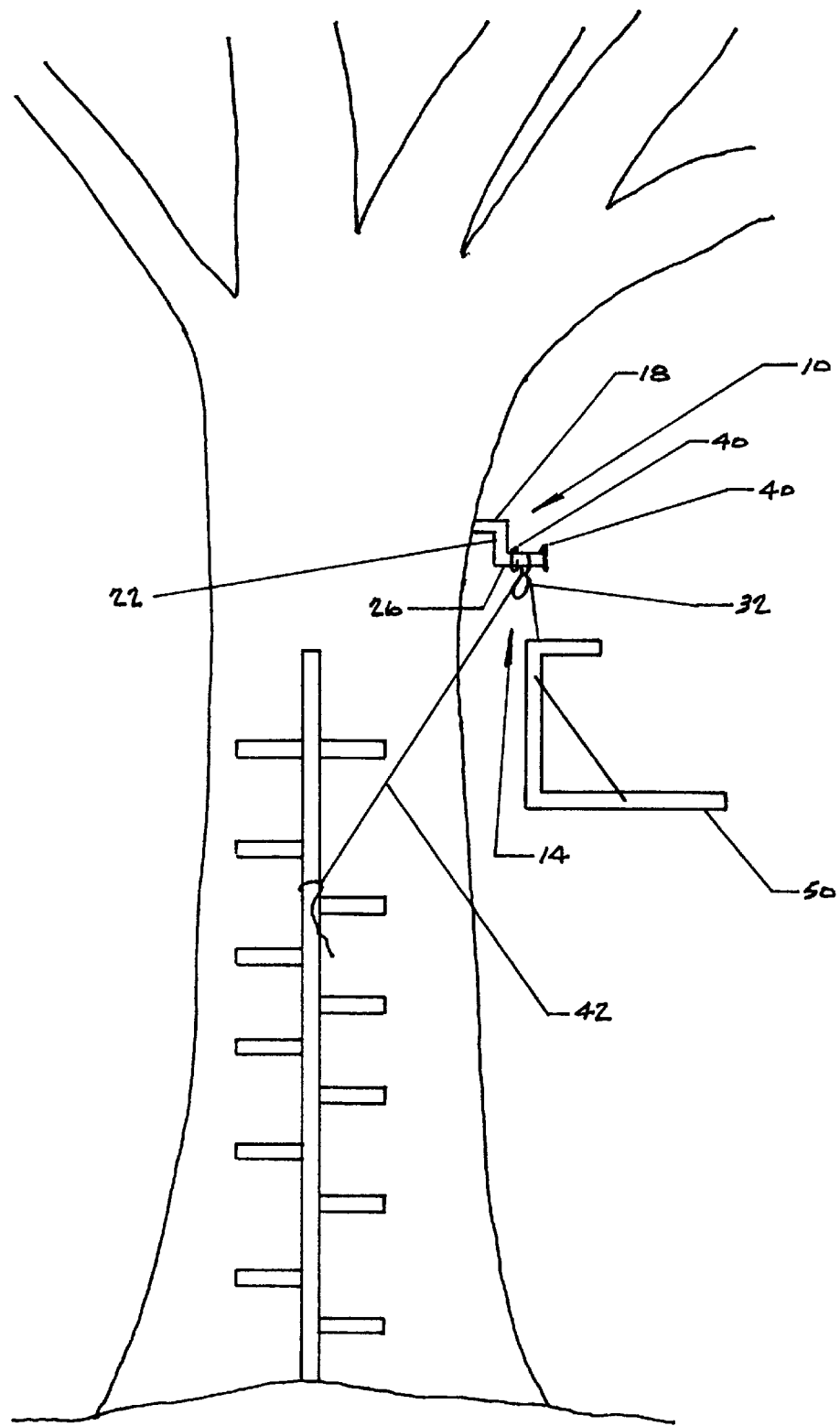
FIG. 3 is a plan view showing the lifting and raising device hereof, in use.

Referring, now, to FIG. 3, there is shown the present device 10 or 110 in use. The present device enables the raising and elevating of a load, such as a tree blind 50. In deploying the device 10 or 110, the threaded portion 20 of the first leg 18 is inserted into a tree or similar structure, as shown. One end of a rope 42 or 142 or other cord is threaded over the pulley 32 or 132 with one end of the rope 42 or 142 secured to the blind or similar load while the other end of the rope 42 or 142 is grasped. As the other or free end of the rope 42 or 142 is drawn toward the user, the rope 42 or 142 passes over the pulley wheel 33 or 133 to facilitate the lifting of the blind or other structure.

It is to be appreciated from the preceding that the present invention provides not only a tree step, but also imparts a utility or function thereto that enables a tree step to be adapted to the lifting or loads, such as hunting equipment, bicycles, or similar loads.

While the invention has been illustrated and described in detail in the drawings and the foregoing description, the same is to be considered as illustrative and not restrictive in character, it being understood that only the preferred embodiments have been shown and described fully and that all changes and modifications that come within the spirit of the invention are desired to be protected.

Having, thus, described the invention, what is claimed is:

1. A tree mountable lifting and raising device for hoisting a load, comprising:
   (a) a shank comprising a first leg, a second leg, and a third leg; the second leg having a first end and an opposed second end, the first leg extending from the first end of the second leg substantially normal thereto in a first direction, the third leg extending from the second end of the second leg substantially normal thereto in a second direction substantially opposite the first direction, the first leg of the shank terminating in a point, at least a portion of the first leg proximate the point being threaded to facilitate penetration of the first leg into a tree, (b) an elevating element mounted to the third leg, and (c) a device for retaining the elevating element disposed on the third leg, wherein the elevating element comprises a pulley and the device for retaining comprises at least two spaced apart nuts mounted on the shank on opposite sides of the pulley.

2. The lifting and raising device of claim 1 wherein the first, second, and third legs are integrally formed.

3. The lifting and raising device of claim 2 wherein the third leg has an external surface, and further wherein at least a portion of the external surface of the third leg is a roughened surface.

4. The lifting device and raising device of claim 1 wherein the elevating element comprises:

(a) a ring disposed around the third leg (b) said nuts for retaining the ring on the shank; and said pulley secured to the ring.

5. The lifting and raising device of claim 4, wherein the diameter of the nuts comprises at least one stop member mounted on the third leg, the diameter of the at least one stop member being greater than the diameter of the ring.

6. The lifting and raising device of claim 4 wherein the pulley is a swivel pulley, the swivel pulley comprising:

(a) a pair of spaced apart side walls;

(b) an axle spanning the space between the side walls and secured to each of the side walls; and (c) a wheel rotatably journalled onto the axle.

7. The lifting and raising device of claim 1 wherein the pulley is a fixed pulley, the fixed pulley comprising:

(a) a U-shaped housing comprising:

(i) a pair of spaced apart side walls, (ii) a top plate integral with the side walls;

(b) an axle spanning the space between the side walls below the top plate and secured to each of the side walls;

(c) a grooved wheel journalled onto the axle; and wherein the third leg extends through the space between the side walls and frictionally engages the top plate.

8. The lifting and raising device of claim 4 further comprising a rope disposed around the pulley.

9. The lifting and raising device of claim 1 wherein the elevating element comprises:

(a) a ring disposed around the third leg; and (b) a pulley swiveably secured to the ring.

10. The lifting and raising device of claim 9 wherein the pulley is a swivel pulley, the swivel pulley comprising:

(a) a pair of spaced apart side walls;

(b) an axle spanning the space between the side walls and secured to each of the side walls; and (c) a wheel rotatably journalled onto the axle.

11. The lifting and raising device of claim 9 wherein the pulley is a fixed pulley, the fixed pulley comprising:

(a) a U-shaped housing comprising:

(i) a pair of spaced apart side walls, (ii) a top plate integral with the side walls;

(b) an axle spanning the space between the side walls below the top plate and secured to each of the side walls;

(c) a grooved wheel journalled onto the axle; and wherein the shank extends through the space between the side walls and frictionally engages the top plate.

12. The lifting and raising device of claim 9 further comprising a rope disposed around the pulley.

* * * * *